June 1, 1965  J. H. WARNER  3,187,088
HIGH VOLTAGE CABLE SPLICE
Filed Nov. 1, 1962  2 Sheets-Sheet 1
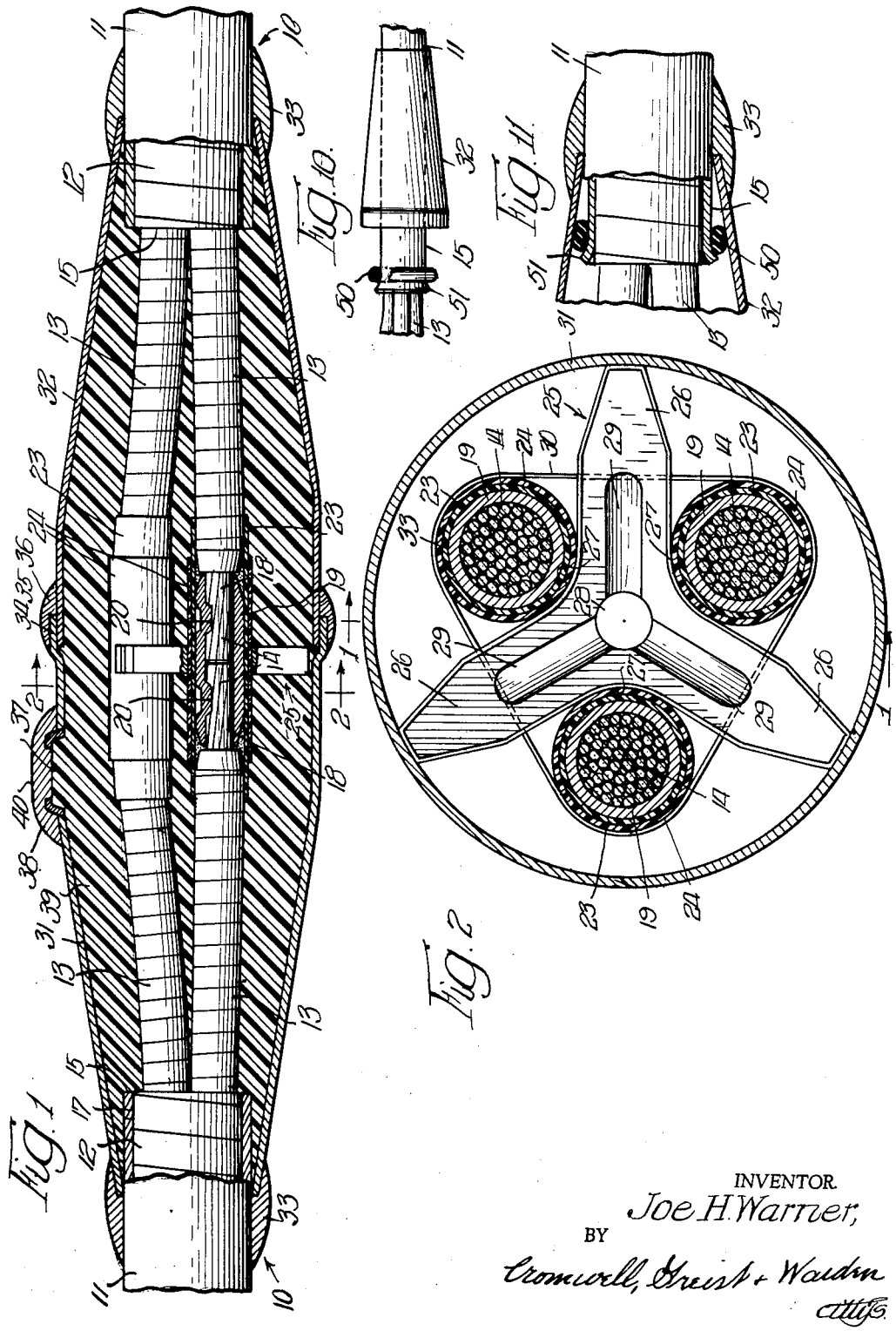
INVENTOR.
Joe H. Warner,
BY
Cromwell, Greist + Warden
Attys.

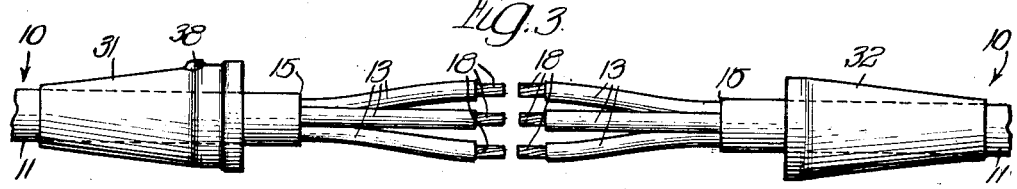
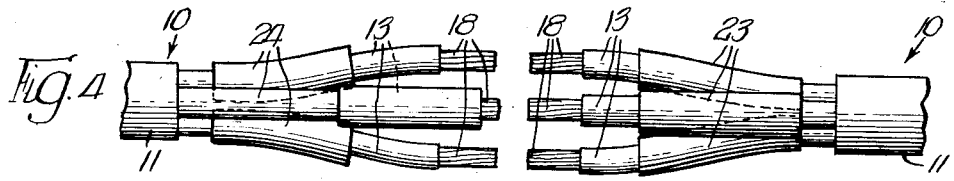
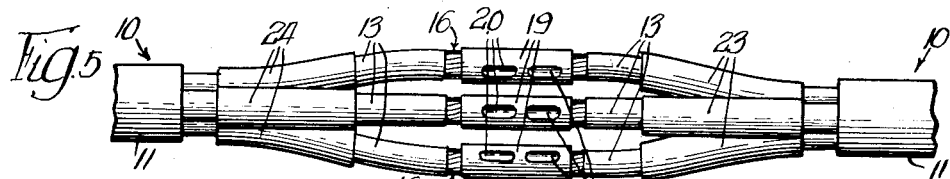
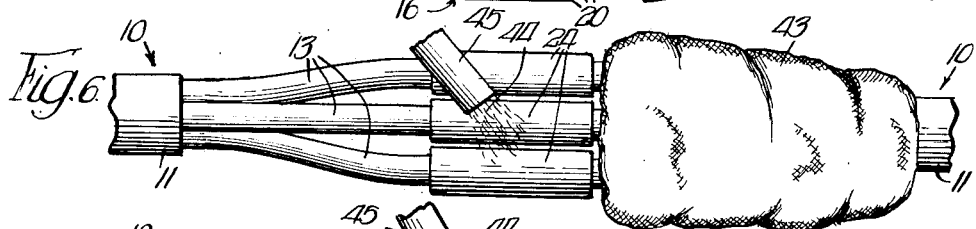
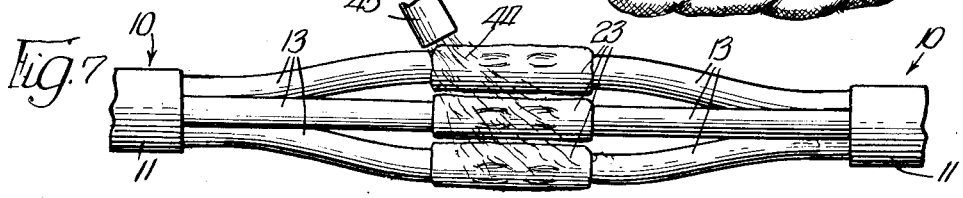
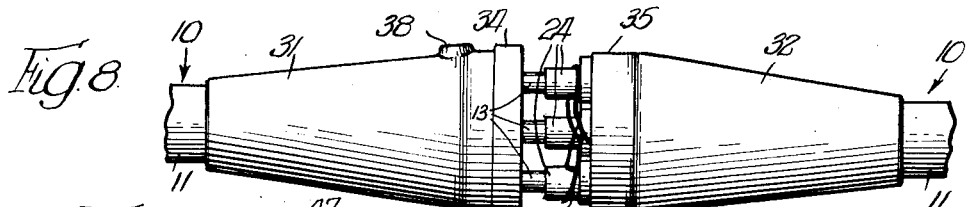
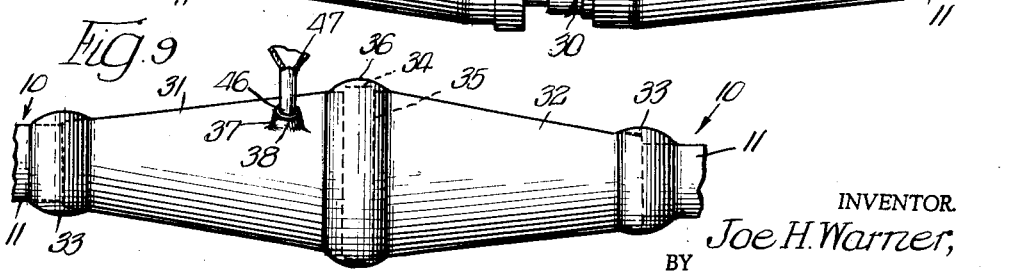
INVENTOR.
Joe H. Warner, 3,187,088
HIGH VOLTAGE CABLE SPLICE
Joe H. Warner, Chicago, Ill., assignor to Minerallac Electric Company, Chicago, Ill., a corporation of Illinois
Filed Nov. 1, 1962, Ser. No. 234,724
4 Claims. (Cl. 174—91)

This invention relates, generally, to splices for high voltage polyphase lead covered cables and it has particular relation to the construction of such splices and the method of making them.

Among the objects of this invention are: To provide a cable splice of the aforesaid kind and character that requires a minimum of time and material for making it; to make the splice in such manner that the insulation between the conductors where they are mechanically and electrically interconnected is equal to or greater than the insulation between the conductors for the remainder of the interconnected cable sections; to overlie the connectors mechanically and electrically interconnecting the bared ends of the conductors with one or more heat shrinkable plastic sleeves having the ends overlying the end portions of the conductor insulation; to apply sufficient heat to the plastic sleeves to cause them to shrink into close fitting engagement with the surfaces underlying them; to apply successively plastic sleeves to the joint between each pair of conductors and to heat shrink them successively in place; to hold in spaced relation the spliced ends of the conductors having the plastic sleeves shrunk thereon; to enclose the spaced apart conductors within metallic sleeve portions extending from and secured to the metallic sheaths of the cables; and to fill the space within the metallic sleeve portions and around the interconnected conductors insulated and spaced as aforesaid with a dielectric compound, preferably liquid in form at the time of filling. Further objects include use of tapered or conical outer metallic sleeves for greater strength and use of O-rings or similar seals at opposite ends of the cable splice or joint.

In the drawings:
FIG. 1 is a vertical sectional view taken generally along the line 1—1 of FIG. 2 and showing the details of construction of a splice completed in accordance with this invention.
FIG. 2 is a vertical sectional view taken generally along the line 2—2 of FIG. 1.
FIGS. 3, 4, 5, 6, 7, 8 and 9 illustrate the various steps that are employed in accordance with this invention for making the completed cable splice as shown in FIGS. 1 and 2 of the drawings.
FIGS. 10 and 11 are fragmentary detail views showing the use of O-ring seals in another embodiment.

Referring now particularly to FIG. 1 of the drawings, it will be observed that the reference characters 10—10 designate, generally, the ends of high voltage polyphase lead covered cables the individual conductors of which are to be interconnected and then each interconnected conductor insulated from each of the other interconnected conductors. They include metallic sheaths 11—11 of lead or lead alloy overlying layers 12—12 of insulation that are common to layers 13—13 of insulation which are individual to stranded metallic conductors 14—14. In accordance with conventional practice three conductors 14 are employed in each of the polyphase cables 10.

In order to form the joint or splice between the polyphase cables 10—10 the sheaths 11—11 and layers 12—12 of insulation are removed to present the spaced end surfaces 15—15 and expose the layers 13—13 of insulation which individually surround the stranded conductors 14—14. The juxtaposed end portions of the layers 13—13 of insulation are removed so as to provide bared ends 18—18 of the stranded conductors 14—14. The bared ends 18—18 are suitably cleaned or treated to provide good contact engaging surfaces free from extraneous material and arranged for receipt of metallic connector sleeves 19, one for each pair of bared ends 18—18 of the stranded conductors 14—14. In accordance with conventional practice each metallic connector sleeve 19 is crimped or otherwise deformed as indicated at 20—20 into the respective bared end 18—18 in order to provide a good electrical and mechanical connection therebetween.

It is desirable that each pair of conductors 14—14 thus interconnected end to end by a sleeve 19 be insulated from each similarly interconnected pair of conductors to the same or a greater extent than the insulation exists between the conductors in the main portions of the cables 10—10. As an initial step in providing such insulation a heat shrinkable sleeve 23 of plastic material of known type, e.g. pre-dilated, heat- shrinkable polyvinyl tubing, is positioned, as described hereinafter, in overlying relation to the connector sleeve 19 interconnecting each set of bared ends 18—18 of the stranded conductors 14—14. Usually it is desirable to apply a dielectric cement onto the bare portions 16—16 (FIG. 5) of the conductors between opposing ends of the insulation 13 and the sleeves 19 before the plastic sleeves 23 are positioned. The sleeve 23 then is subjected to sufficient heat to cause it to shrink and embrace snugly the external surface of the respective metallic connector sleeve 19 and also the adjacent ends of the layers 13—13 of insulation. Thereafter a second sleeve 24 of heat shrinkable plastic material is applied over the sleeve 23 and it likewise has heat applied thereto so that it is shrunk into close contact engagement with the underlying sleeve 23. It will be seen that the sleeves 23 are longer than the sleeves 24 and that the sleeves 23 are applied first followed by application of the shorter sleeves 24. This sequence allows the ends of the shorter sleeves to be spaced from the longer sleeves when heat is applied to the latter.

While the sleeves 23 and 24 provide some insulation between the respective pairs of interconnected bared ends 18—18 of the stranded conductors 14—14, it is not sufficient to provide the desired degree of insulation commensurate with the insulation provided between the stranded conductors 14—14 throughout the remainder or main portions of the cables 10—10. Accordingly, after the sleeves 23 and 24 have been applied, a spreader, shown generally at 25, is inserted between set of the applied sleeves 23 and 24. The spreader 25 is formed of suitable dielectric material, such as wood or plastic, and it comprises three arms 26 that have curved portions 27 therebetween in which the correspondingly curved outer surfaces of the sleeves 24 of plastic insulation are cradled as shown in FIG. 2. The spreader 25 is formed with a central opening 28 and has slots 29 routed on opposite sides of the arms 26, these slots extending radially outwardly from the central opening 28. A cord 30 then is extended around the insulated portions of the stranded conductors 14—14 and is interlaced with the arms 26 of the spreader 25 for the purpose of securely holding the assembly in position for subsequent application of a filling of an insulating or dielectric compound therearound. Preferably the cord 30 is formed of honey combed cotton so that it will absorb readily the compound subsequently applied and leave a minimum of voids.

The metallic sheaths 11—11 then are extended over the spliced construction shown in FIG. 1 through the provision of frusto-conical metallic casings 31 and 32 that are formed of lead or lead alloy. Wiped joints 33—33 serve to secure the small ends of the casings 31 and 32 to the respective sheaths 11—11 of the cables 10—10. The large end 34 of the casing 31 overlaps the adjacent large end 35 of the casing 32 and a wiped joint 36 serves to interconnect these ends.

In order to fill the cavity provided within the casings 31 and 32, joined as described and shown in FIG. 1, an embossed opening 37 is provided in the casing 31 and it has an upstanding annular flange 38 through which a filling of insulating or dielectric material in liquid form can be introduced into the interior of the cavity provided by casings 31 and 32. Preferably this dielectric filling material, which is shown at 39, is in liquid form when introduced. One suitable dielectric filler is polyester filled resin combined with a suitable catalyst. This insulating material can be prepared in liquid form for pouring through the embossed opening 37 and will self-cure to a resilient mass. Other known and commercially available, dielectric filler compounds may be used. By providing the flange 38 it is possible to completely fill the unoccupied space within the casings 31 and 32 to such an extent that the liquid insulation extends or comes up even with the bottom of the embossed opening 37 leaving the embossment to provide a small air space. Subsequently the embossed opening 31 may be closed by a wiped plug 40 without the filler material getting on the exterior surface of the flange.

The steps involved in the formation of the joint in the polyphase cable shown in FIGS. 1 and 2 and described hereinbefore are important. They are shown in FIGS. 3 to 9 inclusive of the drawings.

Referring first to FIG. 3, it will be observed that the lead sheaths 11—11 and underlying insulation 12—12 are removed to provide the facing end surfaces 15—15. This leaves the layers 13—13 of insulation individual to the stranded conductors 14—14 exposed. The end portions of these layers 13—13 of insulation are removed to provide the bared ends 18—18. Before or after these operations have been accomplished the frusto-conical metallic casings 31 and 32 are slid over the cables 10—10 and are positioned, as shown in FIG. 3, in spaced relation from the bared ends 18—18 of the stranded conductors 14—14.

As shown in FIG. 4 the sleeves 23 and 24 of heat shrinkable plastic insulation are telescoped over the respective layers 13—13 of insulation which have been bared for a sufficient length to permit these sleeves to be positioned as shown here. While the foregoing steps with respect to FIGS. 3 and 4 are shown with the bared ends 18—18 of the stranded conductors 14—14 in close proximity to each other, it will be understood that these operations can be performed with the cables 10—10 in greater spaced relation and as may be desired. However, in order to show the various steps in a minimum of space, the showing in FIGS. 3 and 4 has been used.

The bared ends 18—18 are next mechanically and electrically interconnected. For this purpose the metallic connector sleeves are employed. The bared ends 18—18 of the stranded conductors 14—14 are inserted in the respective ends of the metallic connector sleeves 19 to the position shown in FIG. 5. Thereafter the metallic connector sleeves 19 are crimped or otherwise deformed at 20—20 in conventional manner using a suitable press. This arrangement provides a good electrical and mechanical connection between the bared ends 18—18. Each of the narrow spaces 16—16 (FIG. 5) is now filled with a suitable dielectric cement.

Next, as shown in FIG. 6, a heat resisting cover 43 (e.g., a cloth rag) is temporarily placed over the shorter sleeves 23 of heat shrinkable plastic while the longer sleeves 24 are moved to overlie the metallic connector sleeves 19 with their ends overlying the respective ends of the layers 13—13 of insulation. Then, as shown in FIG. 6, heated air 44 from a nozzle 45 is caused to flow over the sleeves 24 at a temperature and for a sufficient time to render them soft and ductile and to cause them to shrink into snug fitting engagement with the outer surfaces of the metallic connector sleeves 19 and the juxtaposed end portions of the layers 13—13 of insulation.

Next, as shown in FIG. 7, the cover 43 is removed and the sleeves 23 are moved to overlie the previously applied sleeves 24. Again heated air 44 from the nozzle 45 is applied to the sleeves 23 to heat shrink them into position. It will be understood that any suitable source of heated air can be provided for supplying the same to the nozzle 45 which directs it onto the sleeves 23 and 24 in the manner described. Alternately, radiant heat may be used to heat the sleeves.

After the sleeves 23 and 24 have been heat shrunk in place, they and the conductor parts associated therewith are spread apart so as to receive the spreader 25 in the relationship shown in FIG. 2. The cord 30 then is applied, as shown in FIG. 8, in interlacing relation with the arms 26 of the spreader 25 and around the sleeves 23 and 24 in order to hold the stranded conductors 14—14 in proper spaced relationship. Also as shown in FIG. 8, the metallic casings 31 and 32 are moved toward each other into such position that, as shown in FIG. 9, the end 34 of the casing 31 overlies the end 35 of the casing 32. The wiped joints 33 and 36 are made to provide a fluid tight construction between the metallic sheaths 11—11 of the cables 10—10.

The joint, completed as described and shown in FIG. 9, is positioned with the embossed opening 37 in the uppermost position. The dielectric filler or potting compound shown at 46 is poured through the opening 37 from a pouring spout 47 of a suitable container and the filling operation continued until the level of the liquid reaches the bottom of the embossed opening 37 and near the top of the flange 38. Thereafter the plug 40 is wiped over the embossed opening 37 to close it and complete the formation of the splice.

Referring to FIGS. 10 and 11 an embodiment of the invention is shown making use of O-ring seals 50, all other parts being the same. In this embodiment, after each of the conical casings 31 and 32 are slipped back over their respective cable ends, an O-ring seal 50 is next slipped over the end of the cable sheath 15. Any standard O-ring seal of proper size may be used. As is well known they are formed of neoprene or other resilient, rubber-like materials. After each O-ring 50 is in place a suitable tool is used to form flange 51 on each cable sheath end 15 for retaining each O-ring 50 in place. When the two casings 31 and 32 are brought together as shown in FIG. 1 the O-rings 50 will be wedged between the small outer end of each casing and the cable sheath in somewhat flattened condition as shown in FIG. 11. The result is to provide a liquid tight seal which is in the nature of insurance, such as in the event there is some leakage during wiping one of the joints 33.

What is claimed as new is:

1. A high voltage cable joint comprising, in combination, a first set of a plurality of individually insulated flexible conductors enclosed in a common metallic sheath having end portions of the conductors bared and in end to end laterally spaced relation to bared end portions of a second set of like conductors in a common metallic sheath with the ends of the metallic sheaths spaced apart and the insulated flexible conductors extending for substantial distances therefrom, connector sleeves telescoped over the juxtaposed bared end portions of said conductors and mechanically and electrically interconnecting them, a pair of sleeves of heat shrinkable plastic insulation one overlying the other and successively shrunk onto each connector sleeve with at least one of said plastic sleeves shrunk onto the respective ends of the insulation surrounding the respective conductor, a spreader formed of dielectric material having a central portion and arms extending radially between said sleeves and holding them in spaced relation, frusto-conical metallic casings having the large ends juxtaposed in overlying relation to said sleeves and joined together and the small ends telescoped over said ends of said metallic sheaths and joined thereto, and a filling of insulation within the space defined by said metallic casings and said insulated flexible conductors connected and spaced as aforesaid.

2. In a high voltage cable joint, in combination, a pair of insulated flexible conductors having bared end portions in end to end relation, a connector sleeve telescoped over said juxtaposed bared end portions and mechanically and electrically interconnecting them, and a pair of sleeves of heat shrinkable plastic insulation successively shrunk onto said connector sleeve with at least the ends of one shrunk onto the respective ends of the insulation surrounding the respective conductor.

3. In the high voltage cable joint called for in claim 1, a spacing between each end of each of said connector sleeves and the adjacent end of the insulation on the conductor within said connector end, and a deposit of dielectric cement filling each of said spacings.

4. A high voltage cable joint comprising in combination a first set of a plurality of individually insulated flexible conductors enclosed in a common metallic sheath having end portions of the conductors bared and in end-to-end laterally spaced relation to bared end portions of a second set of like conductors in a common metallic sheath with the ends of the metallic sheaths spaced apart and the insulated flexible conductors extending for substantial distances therefrom, connector sleeves telescoped over the juxtaposed bared end portions of said conductors and mechanically and electrically interconnecting them, a sleeve of heat shrinkable plastic insulation overlying and shrunk onto each connector sleeve and onto the respective ends of the insulation surrounding the respective conductor, a spreader formed of dielectrical material having a central portion and arms extending radially between said sleeves and holding them in spaced relation, generally frusto-conical metallic casings having the large ends juxtaposed in overlying relation to said sleeves and joined together and the small ends telescoped over said ends of said metallic sheaths and joined thereto, a filling of insulation within said space defined by said metallic casings and said insulated and flexible conductors connected and spaced as aforesaid and an O-ring seal wedged in between the inside of said small end of each of said generally frusto-conical metallic casings and the exterior of the associated metallic sheets, the adjacent end of the metallic sheet being deformed to prevent said O-ring from slipping off.

References Cited by the Examiner
UNITED STATES PATENTS

| | | | |
|---|---|---|---|
| 1,591,867 | 7/26 | Watson | 174—88 |
| 1,819,881 | 8/31 | Eby | 174—91 |
| 2,282,003 | 5/42 | Scott et al. | 174—22 |

FOREIGN PATENTS

| | | |
|---|---|---|
| 878,993 | 10/61 | Great Britain. |
| 883,155 | 11/61 | Great Britain. |

E. JAMES SAX, *Primary Examiner.*

DARRELL L. CLAY, JOHN P. WILDMAN, *Examiners.*